Figure 1:
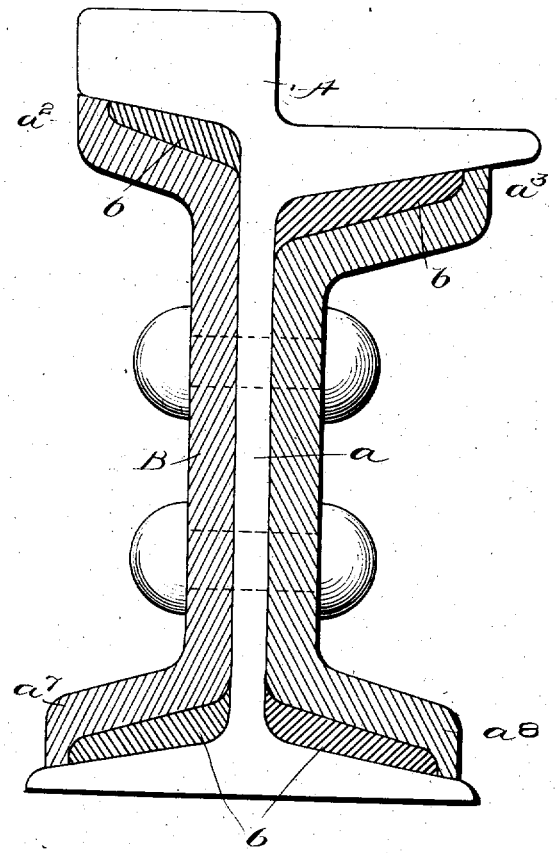

No. 12,074. REISSUED JAN. 27, 1903.

H. B. NICHOLS & C. B. VOYNOW.

RAIL JOINT.

APPLICATION FILED JULY 26, 1902.

Witnesses:
J. M. Fowler Jr.
Spencer Prentiss.

Inventors
Henry B. Nichols, and
Constantine B. Voynow,
By Chas. D. Harvey, Atty

UNITED STATES PATENT OFFICE.

HENRY B. NICHOLS AND CONSTANTINE B. VOYNOW, OF PHILADELPHIA, PENNSYLVANIA.

RAIL-JOINT.

SPECIFICATION forming part of Reissued Letters Patent No. 12,074, dated January 27, 1903.

Original No. 673,649, dated May 7, 1901. Application for reissue filed July 26, 1902. Serial No. 117,090.

*To all whom it may concern:*

Be it known that we, HENRY B. NICHOLS and CONSTANTINE B. VOYNOW, citizens of the United States, residing at Philadelphia, in the county of Philadelphia and State of Pennsylvania, have jointly invented certain new and useful Improvements in Rail-Joints, of which the following is a specification.

Our invention has relation to a rail-joint for the contiguous ends of meeting rails; and in such connection it relates to the construction and arrangement of the parts constituting such a rail-joint to prevent relative movement of or independent action of the joined rail-sections incident to the passage of a car or traffic thereover.

The principal object of our invention is to provide a comparatively simple, durable, and perfect joint for the meeting ends of rail-sections to insure unbroken continuity of the abutting or joined rail-sections, and thus to prevent relative movement of said joined rails incident to the passage of cars over the same, thereby prolonging the life of the rail ends and lessening noise and jar, as well as wear and tear on the rolling-stock.

Heretofore fish-plates rolled, forged, or cast to conform to the outline of the sides of the rail were bolted or riveted on each side of the rails, and the contact of such plates with the foot, underhead, and tram was relied upon to maintain the relative position of the rails; but in practice it has been found that rolled or even machined fish-plates would not give the required contact to form a continuous support to the rail, because invariably when fish-plates were bolted or riveted onto the rail the contact, which is the essence of the rail-joint, was only established at certain points and in course of time would either rust away, due to moisture or other extraneous causes, or be hammered away under continual pounding of the rolling-stock and other influences of traffic. According to our invention these objectionable features are obviated by the employment of a substance or metallic material, which when introduced in a fluid state into the space provided therefor will fill up and harden therein, and thus compensate for irregularities existing in both the rail-sections and fish-plates, thereby providing a continuous and perfect support for the rail-sections.

Our invention, stated in general terms, consists of a rail and fish plate or plates or channels contacting with or abutting against the web of the rail and a suitable liner interposed in a fluid state between said fish plate or plates and said rail adapted to fill the spaces, so as to become practically a continuous support for the rail-sections at the contiguous meeting ends of such rail-sections, and the fish plate or plates suitably bolted, riveted, or otherwise secured to the joined or abutting rail-sections.

The nature and scope of our present invention will be more fully understood from the following description, taken in connection with the accompanying drawings, forming part hereof, in which—

Figure 2:
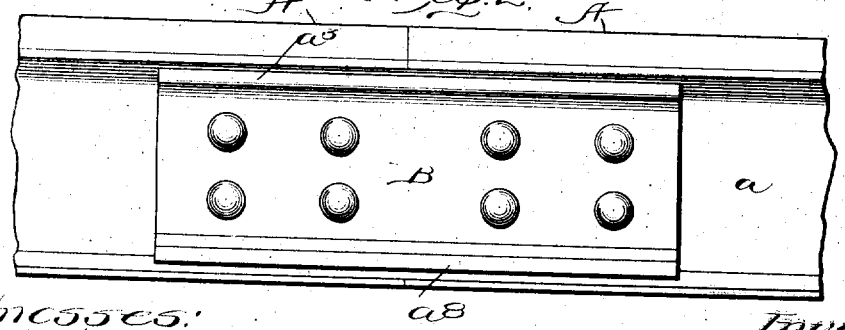

Figure 1 is a vertical longitudinal section through rail-sections, showing the fish-plates or channels in application thereto, embodying features of our invention, with a liner consisting of a fluid or molten metallic or other suitable substance or material interposed between the rail-sections and the fish-plates or channels and filling the space provided for the same adjacent the web; and Fig. 2 is a side elevational view of two meeting rail-sections, showing our invention in application thereto, as illustrated in Fig. 1.

Referring to the drawings, A is the rail, of any well-known construction.

B represents fish-plates or channels abutting against the web portion $a$ of the rails and contacting at $a^2$, $a^3$, $a^7$, and $a^8$ thereof. It is, however, not absolutely necessary that the said fish-plates or channels should contact at the points above mentioned, as they may be arranged so that narrow spaces are provided between the upper and lower flanged portions of the plates or channels and the rail-sections for the purpose of introducing a suitable substance to take the place in the filling up of the spaces of the metal contacts of the plates or channels at the said points with the rail-sections.

$b$ is a liner consisting of metallic or other material interposed in a fluid state between the rails and the fish-plates or channels in any preferred manner by pouring the same through spaces provided therefor in the fish-plates or channels, thereby to provide for any irregularities due to the rolling of the rails and fish-plates, and thus to form a continuous and perfect support for the same. This liner may consist of zinc, spelter, type or Babbitt metal, or the like, or it may consist of other materials, such as sulfur or the like. In the lower portions of the fish-plates or channels may be provided openings on each side for the introduction of the liner between the base of the rail and the spaces formed by the fish-plates or channels in position in their abutment against the web of the rails riveted, bolted, or otherwise secured thereto, this substance or material filling up entirely the spaces and making thereby a perfect support for the rail-sections.

Having described our invention, what we claim as new, and desire to secure by Letters Patent of the United States, is—

1. A rail-joint comprising contiguous rail-sections, a fish plate or plates connecting said sections, and a suitable liner interposed in a fluid state between said fish plate or plates and said rail-sections.

2. A rail-joint comprising two contiguous rail-sections, fish-plates or channels contacting with or abutting against the webs of said sections and a suitable liner interposed in a molten state between said fish-plates or channels and said rail-sections.

3. A rail-joint comprising contiguous rail-sections, a fish plate or plates connecting said sections, and a suitable liner interposed in a channel formed between a portion of said fish plate or plates and an adjacent flange of said rail-sections.

4. A rail-joint comprising two contiguous rail-sections, fish-plates or channels contacting with or abutting against the webs of said sections and a suitable liner interposed between the upper and lower flanges of said fish-plates or channels and said rail-sections.

5. A rail-joint comprising rail-sections abutting against each other, fish-plates or channels suitably secured to the webs of said rails and a metal liner interposed between the flanges of said plates or channels and said rail-sections, and forming a support for the flanged portions of said rail-sections with said fish-plates.

6. A rail-joint comprising contiguous rail-sections, fish-plates or channels abutting against said sections, said fish-plates or channels riveted or bolted to the web portions of said rail-sections and a liner consisting of a fluid substance or material, such as zinc, spelter, type or Babbitt metal or the like poured between said plates and rail-sections to form a support for the flanged portions of said rail-sections with said fish-plates.

In testimony whereof we have hereunto signed our names in the presence of two subscribing witnesses.

HENRY B. NICHOLS.
CONSTANTINE B. VOYNOW.

Witnesses:
GEO. B. TAYLOR,
FRANCIS HEAD.